(12) United States Patent
Jang

(10) Patent No.: US 8,692,883 B2
(45) Date of Patent: Apr. 8, 2014

(54) ENCODING APPARATUS OF VIDEO SECURITY SYSTEM

(75) Inventor: Gwang-whoon Jang, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 846 days.

(21) Appl. No.: 12/819,459

(22) Filed: Jun. 21, 2010

(65) Prior Publication Data
US 2010/0328459 A1 Dec. 30, 2010

(30) Foreign Application Priority Data
Jun. 25, 2009 (KR) .................. 10-2009-0057207

(51) Int. Cl.
*H04N 7/18* (2006.01)
(52) U.S. Cl.
USPC ............... 348/143; 348/344; 375/240.02
(58) Field of Classification Search
USPC .................. 348/143, 344; 375/240.02
See application file for complete search history.

(56) References Cited

U.S. PATENT DOCUMENTS

| | | | |
|---|---|---|---|
| 6,006,107 A * | 12/1999 | Tomioka et al. | 455/552.1 |
| 7,671,893 B2 * | 3/2010 | Li et al. | 348/211.3 |
| 2005/0084835 A1 * | 4/2005 | Lau et al. | 434/307 A |
| 2005/0141331 A1 * | 6/2005 | Cho | 365/233 |
| 2007/0217501 A1 * | 9/2007 | Siemens et al. | 375/240.01 |
| 2009/0067626 A1 * | 3/2009 | Dufaux et al. | 380/217 |
| 2010/0026810 A1 * | 2/2010 | Kajita et al. | 348/159 |

OTHER PUBLICATIONS

Wei Yao, Scalable Video Coding in a Nutshell, 2008, Synthesis Journal.*

* cited by examiner

*Primary Examiner* — David Lazaro
*Assistant Examiner* — Marie Georges Henry
(74) *Attorney, Agent, or Firm* — Sughrue Mion, PLLC

(57) ABSTRACT

An encoding apparatus of a video security system in which a stream to be stored in a storage medium and a stream to be transmitted through a network may be simultaneously or separately generated using one encoding chip. The encoding apparatus includes an image encoding unit which encodes an input image, received from a surveillance camera, selectively under at least one of an advanced video coding (AVC) scheme complying with an H.264/AVC standard to generate and store an AVC-encoded image in a storage medium, and a scalable video coding (SVC) scheme complying with the H.264/AVC standard to generate and transmit an SVC-encoded image to a network.

13 Claims, 3 Drawing Sheets

ENCODING APPARATUS OF VIDEO SECURITY SYSTEM

CROSS-REFERENCE TO RELATED PATENT APPLICATION

This application claims priority from Korean Patent Application No. 10-2009-0057207, filed on Jun. 25, 2009, the disclosure of which is incorporated herein in its entirety by reference.

BACKGROUND

1. Field

Apparatuses consistent with the present inventive concept relate to a video security system, and more particularly, to an encoding apparatus of a video security system in which a stream to be stored in a storage medium and a stream to be transmitted through a network may be simultaneously or separately generated using one encoding chip.

2. Description of the Related Art

In general, encoding schemes such as an H.264/Advanced Video Coding (AVC) standard are excellent for generating data for storage purposes, but not effective for generating data to be transmitted through a network. However, this drawback may be improved by the H.264/Scalable Video Coding (SVC) scheme. The H.264 SVC scheme complies with the H.264 AVC standard. However, the H.264 SVC scheme may not be used with an image storage device due to a resolution limit for a base layer.

SUMMARY

One or more of the exemplary embodiments provides an encoding apparatus of a video security system in which a stream to be stored in a storage medium and a stream to be transmitted via a network may be simultaneously or separately generated using one encoding chip.

According to an exemplary embodiment, there is provided an encoding apparatus of a video security system, including: an image encoding unit which encodes an input image, received from a surveillance camera, selectively under at least one of: an advanced video coding (AVC) scheme complying with an H.264/AVC standard to generate and store an AVC-encoded image in a storage medium; and a scalable video coding (SVC) scheme complying with the H.264/AVC standard to generate and transmit an SVC-encoded image to a network.

The image encoding unit may include: a plurality of layer encoding units each of which extracts motion information about a corresponding layer image of the input image through motion estimation and residual information about the corresponding layer image through in-picture prediction, and entropy-encodes the motion information and the residual information, selectively under at least one of the AVC scheme and the SVC scheme, to generate and output at least one of a corresponding AVC-encoded image and a corresponding SVC-encoded image; an interlayer prediction unit which is disposed between each adjacent two of the plurality of layer encoding units, and is configured to support encoding an upper layer image of the input image by an upper layer encoding unit among the plurality of layer encoding units by providing the upper layer encoding unit with the motion information and the residual information about a lower layer image of the input image received from a lower layer encoding unit among the plurality of layer encoding units; a multiplexer which is configured to multiplex SVC-encoded images output from the plurality of layer encoding units to output a multiplexed result to the network, according to a first selection signal; and a switching unit which is configured to select one of AVC-encoded images output from the plurality of layer encoding units, and output the selected one of the AVC-encoded images to the storage medium, according to a second selection signal.

The layer images to be input to the plurality of layer encoding units may include a layer image spatial-decimated according to a condition of the corresponding layer encoding unit.

When encoding the input image into the AVC-encoded image, one of the plurality of layer encoding units and the switching unit are turned on to operate.

When encoding the input image into the SVC-encoded image, at least one of the plurality of layer encoding units, the interlayer prediction layer and the multiplexer are turned on to operate.

BRIEF DESCRIPTION OF THE DRAWINGS

The above and other aspects of the present inventive concept will become more apparent by describing in detail exemplary embodiments thereof with reference to the attached drawings, in which.

DETAILED DESCRIPTION OF EXEMPLARY EMBODIMENTS

The present inventive concept will now be described more fully with reference to the accompanying drawings, in which exemplary embodiments are shown.

Figure 1:
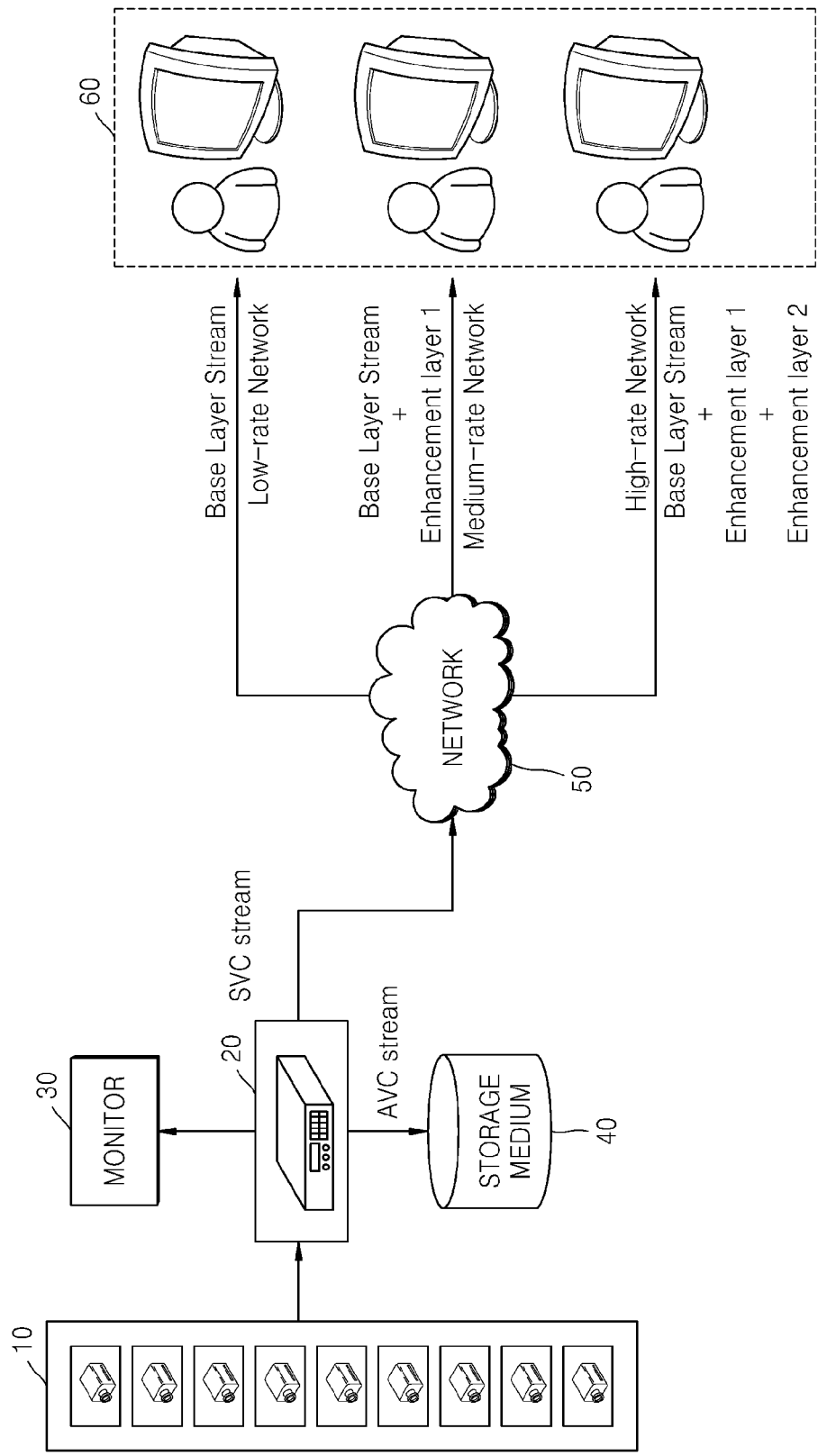
FIG. 1 is a schematic view of a video security system including an encoding apparatus according to an exemplary embodiment.

FIG. 1 is a schematic view of a video security system including an encoding apparatus according to an exemplary embodiment. Referring to FIG. 1, the video security system includes a surveillance cameras 10, a digital video recorder (DVR) 20, a monitor 30, a storage medium (for example, a hard disc drive (HDD)) 40, a network 50, and a receiving apparatus 60.

The video security system may detect and track an intruder by remote controlling the surveillance cameras 10, which may focus on a distant object or on a close object, during both daytime and nighttime. The video security system having such functions may be used in a watching and tracking system in a danger zone or for an illegal parking control system.

To this end, images are transmitted from the surveillance cameras 10 equipped in a specific area. Then, the specific area may be watched using the received images in a control center that is connected to the surveillance cameras 10. In other words, the surveillance cameras 10 connected to the control center transmit image information to the control center.

While communicating with the DVR 20 through a communication channel, the surveillance cameras 10 transmit a live-view image signal through a video signal channel.

The image signal transmitted to the DVR 20 is displayed on a monitor 30, and at the same time, is stored in the storage medium 40 after being processed according to the advanced video coding (AVC) standard and/or is transmitted to a network 50 after being processed according to the scalable video coding (SVC) scheme defined under the H.264/AVC standard.

The image signal transmitted to the network 50 after being processed according to the SVC scheme is transmitted in different formats (e.g., bit-rate, frame-rate, and resolution) to the receiving apparatuses 60 according to a condition of the receiving apparatuses 60 (e.g., according to whether the receiving apparatuses 60 use a low-rate network, a medium-rate network, or a high-rate network). If a receiving apparatus 60 uses a low-rate network, the image signal is transmitted as a base layer SVC stream. If the receiving apparatus 60 uses a medium-rate network, the image signal is transmitted as a base layer+enhancement layer 1 SVC stream. If the receiving apparatus 60 uses a high-rate network, the image signal is transmitted as a base layer+enhancement layer 1+enhancement layer 2 SVC stream.

Figure 2:
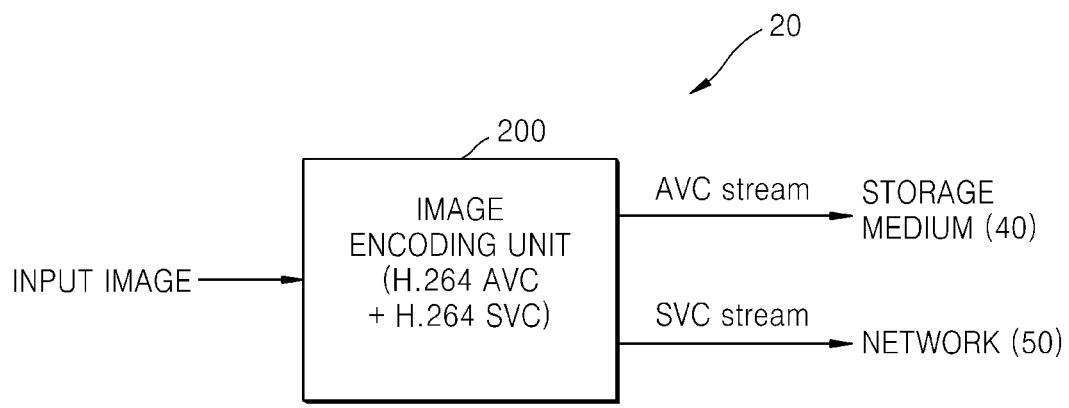
FIG. 2 is a schematic view of an image encoding unit of a digital video recorder in the video security system of FIG. 1, according to an exemplary embodiment.
Figure 3:
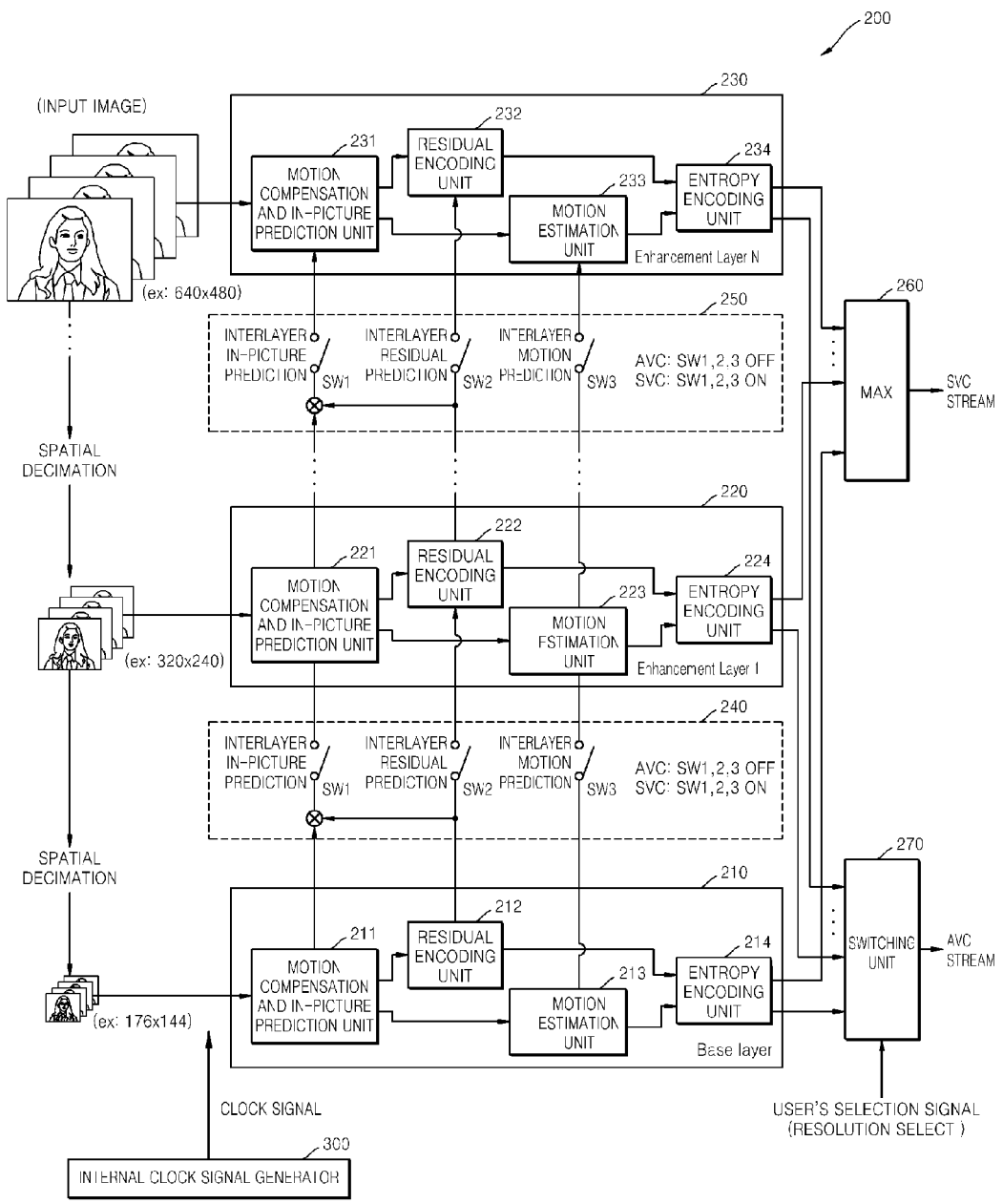
FIG. 3 is a detailed block diagram of the image encoding unit of FIG. 2, according to an exemplary embodiment.

FIG. 2 is a block diagram of the DVR 20 of FIG. 1, including an image encoding unit 200. FIG. 3 is a detailed block diagram of the image encoding unit 200 of FIG. 2.

Referring to FIG. 2, the image encoding unit 200 of the DVR 20 may encode an image signal received from the surveillance cameras 10 in such a way as to be able to selectively output either an AVC stream or an SVC stream. Alternatively, the image encoding unit 200 may simultaneously output an AVC stream and an SVC stream. In technical aspects of image encoding, the image encoding unit 200 does not use two separate encoding units; rather, a plurality of encoding blocks of one encoding unit may be used in common for different encodings. Thus, complexity of the image encoding unit 200 may not double, such as when using two separate encoding units.

Referring to FIG. 3, the image encoding unit 200 includes a base layer encoding unit 210, an enhancement layer 1 encoding unit 220 through an enhancement layer N encoding unit 230, a first interlayer prediction unit 240 through an $N^{th}$ interlayer prediction unit 250, a multiplexer (MUX) 260, and a switching unit 270. The image encoding unit 200 may further include an internal clock signal generator 300 which generates and provides a clock signal to each of the aforementioned units constituting the image encoding unit 200.

A first input image (for example, having a 640×480 resolution) is input to the enhancement layer N encoding unit 230. A second input image (for example, having a 320×240 resolution) obtained through a spatial decimation of the first input image is input to the enhancement layer 1 encoding unit 220. A third input image (for example, having a 176×144 resolution) obtained through a spatial decimation of the second input image is input to the base layer encoding unit 210.

The base layer encoding unit 210, the enhancement layer 1 encoding unit 220, and the enhancement layer N encoding unit 230 extract motion information about layer images, i.e., the third input image (for example, having a 176×144 resolution after the spatial decimation), the second input image (for example, having a 320×240 resolution after the spatial decimation), and the third input image (for example, having a 640×480 resolution), respectively, and extract residual information about the layer images, i.e., the third input images, the second input images, and the first input images, respectively, to entropy-encode the motion information and the residual information. To this end, the base layer encoding unit 210, the enhancement layer 1 encoding unit 220, and the enhancement layer N encoding unit 230, respectively, include motion compensation and in-picture prediction units 211, 221 and 231, residual encoding units 212, 222 and 232, motion estimation units 213, 223 and 233 and entropy encoding units 214, 224 and 234.

The motion compensation and in-picture prediction units 211, 221 and 231 may perform interframe motion compensation and in-picture prediction in a frame. For example, assuming an object with an invariable shape is moving (for example, a car traveling on a road), if the direction and speed of the motion are known, an accurate prediction picture may be created based on the information about the object at a high interframe prediction efficiency. In in-picture prediction, a next pixel signal is predicted based on the correlation of pixel signals in a single frame, and a differential image between a predicted image and the original image is output.

The residual encoding units 212, 222 and 232, respectively, encode differential images between the original images (i.e., the first input image, the second input image, and the third input image) and the predicted images output from the motion compensation and in-picture prediction units 211, 221 and 231.

The motion estimation units 213, 223 and 233 compare overlapping images between the motion-compensated frame and a next frame to predict motion in the next frame.

The entropy encoding unit 214, 224 and 234, respectively, entropy-encode the outputs from the residual encoding unit 212, 222 and 232 and from the motion estimation units 213, 223 and 233.

The first interlayer prediction unit 240 outputs a result of the motion compensation and in-picture prediction, a result of the residual encoding and a result of the motion estimation from the base layer encoding unit 210 to the motion compensation and in-picture prediction unit 221, the residual encoding unit 222 and the motion estimation unit 223 of the enhancement layer 1 encoding unit 220, respectively, to support an operation of the enhancement layer 1 encoding unit 220. In the current exemplary embodiment, the first interlayer prediction unit 240 includes switches SW1, SW2 and SW3 for switching the result of the motion compensation and in-picture prediction, the result of the residual encoding and the result of the motion estimation, respectively, to the enhancement layer 1 encoding unit 220. An operation of the switches SW1, SW2 and SW3 will be described later.

The $N^{th}$ interlayer prediction unit 250 outputs a result of the motion compensation and in-picture prediction, a result of the residual encoding and a result of the motion estimation from, for example, the enhancement layer $(N-1)^{th}$ encoding unit 220, to the motion compensation and in-picture prediction unit 231, the residual encoding unit 232 and the motion estimation unit 233 of the enhancement layer N encoding unit 230, respectively, to support an operation of the enhancement layer N encoding unit 230. In the current exemplary embodiment, the $N^{th}$ interlayer prediction unit 250 includes switches SW1, SW2 and SW3 for switching the result of the motion compensation and in-picture prediction, the result of the residual encoding and the result of the motion estimation, respectively, to the enhancement layer N encoding unit 230. An operation of the switches SW1, SW2 and SW3 will be described later.

The MUX 260 multiplexes streams that are output from the base layer encoding unit 210 and the enhancement layer 1 encoding unit 220 through the enhancement layer N encoding unit 230 to transmit a multiplexed result to the network 50. For example, if the receiving apparatus 60 uses a low-rate network, an SVC stream output from the base layer encoding unit 210 is output to the receiving apparatus 60. If the receiving apparatus 60 uses a medium-rate network, an SVC stream multiplexed from the streams output from the base layer encoding unit 210 and the enhancement layer 1 encoding unit 220 is output to the receiving apparatus 60. If the receiving apparatus 60 uses a high-rate network, an SVC stream multiplexed from the streams output from the base layer encoding unit 210, the enhancement layer 1 encoding unit 220 and the enhancement layer N encoding unit 230 is output to the receiving apparatus 60.

The switching unit 270 outputs an AVC stream output from one of the base layer encoding unit 210, the enhancement layer 1 encoding unit 220 and the enhancement layer N encoding unit 230 to the storage medium 40 according to a resolution selection signal (to select the third input image, the second input image or the first input image) from a user, while the first interlayer prediction unit 240 through the $N^{th}$ interlayer prediction unit 250 are turned off.

Hereinafter, an operation of outputting an AVC stream and/or an SVC stream will be described with reference to the above description.

When a user wants to store images received from the surveillance cameras 10 in the storage medium 40, the image encoding unit 200 is operated in an H.264 AVC mode. The user may select a resolution of the images to be stored in the storage medium 40. When the image encoding unit 200 is operated in the H.264 AVC mode, the switches SW1, SW2 and SW3 of the first interlayer prediction unit 240 and the $N^{th}$ interlayer prediction unit 250 and the MUX 250 are turned off. Only one of the base layer encoding unit 210, the enhancement layer 1 encoding unit 220, and the enhancement layer N encoding unit 230 is operated according to the resolution selected by the user. The switching unit 270 executes switching to output an AVC stream from one of the encoding units to the storage medium 40.

For example, when a user wants to store images received from the surveillance cameras 10 in the storage medium 40 as images having a 320×240 resolution, the switches SW1, SW2 and SW3 of the first interlayer prediction unit 240 through the $N^{th}$ interlayer prediction unit 250 are turned off, and only the enhancement layer 1 encoding unit 220, and neither the base layer encoding unit 210 nor the enhancement layer N encoding unit 230, is operated. The enhancement layer 1 encoding unit 220 encodes the input image having a 320×240 resolution, which is obtained by the spatial decimation of the first input image (640×480), to generate an AVC stream. The AVC stream is output through the switching unit 270 to the storage medium 40.

When a user wants to transmit images received from the surveillance cameras 10 to the receiving apparatus 60 via the network 50, the image encoding unit 200 is operated in an H.264 SVC mode. When the image encoding unit 200 is operated in the H.264 SVC, the switching unit 270 does not operate. The switches SW1, SW2 and SW3 of the first interlayer prediction unit 240 and the $N^{th}$ interlayer prediction unit 250 are turned on. The base layer encoding unit 210, the enhancement layer 1 encoding unit 220 and the enhancement layer N encoding unit 230 are operated to provide the encoding results thereof to the MUX 250. The MUX 250 transmits an SVC stream according to a condition of the receiving apparatus 60.

When a user wants to store images received from the surveillance cameras 10 in the storage medium 40 and to transmit the same to the receiving apparatus 60 via the network 50, the image encoding unit 200 is operated in an H.264 AVC/H.264 SVC mode.

When the image encoding unit 200 is operated in the H.264 AVC/H.264 SVC mode, all the elements of the encoding unit 200 are operated. The switches SW1, SW2 and SW3 of the first interlayer prediction unit 240 and the $N^{th}$ interlayer prediction unit 250 are selectively turned on or off according to a clock signal.

The base layer encoding unit 210 generates an AVC stream and an SVC stream in the same way. However, when generating SVC streams, the enhancement layer 1 encoding unit 220 through the enhancement layer N encoding unit 230 encode the images based on the results of the interlayer prediction. Thus, the enhancement layer 1 encoding unit 220 through the enhancement layer N encoding unit 230 may be operated at a rate twice that of the base layer encoding unit 210. The switches SW1, SW2 and SW3 of the first interlayer prediction unit 240 through the $N^{th}$ interlayer prediction unit 250 are turned off in response to an odd-numbered clock to not operate and are turned on in response to an even-numbered clock to operate. The image encoding unit 200 is operated in the H.264 AVC mode at an odd-numbered clock to store an AVC stream in the storage medium 40 and is operated in the H.264 SVC mode at an even-numbered clock to transmit an SVC stream to the network 50.

As described above, according to the one or more exemplary embodiments, a stream to be stored in a storage medium and a stream to be transmitted via a network may be simultaneously or separately generated using one encoding chip. Thus, separate encoding chips for generating such different stream formats are unnecessary, thus reducing the size and costs of an encoding apparatus may be achieved.

While the present inventive concept has been particularly shown and described with reference to the above exemplary embodiments thereof, it will be understood by those of ordinary skill in the art that various changes in form and details may be made therein without departing from the spirit and scope of the present inventive concept as defined by the following claims.

What is claimed is:

1. An encoding apparatus of a video security system, comprising:
    an image encoding circuitry which encodes an input image, received from a surveillance camera, selectively under at least one of:
        an advanced video coding (AVC) scheme complying with an H.264/AVC standard to generate and store an AVC-encoded image in a storage medium; and
        a scalable video coding (SVC) scheme complying with the H.264/AVC standard to generate and transmit an SVC-encoded image to a network;
    a switch which receives a signal from a user, the signal comprising an indication of whether at least one of the AVC scheme and the SVC scheme is selected, and which controls the image encoding circuitry to encode the input image using at least one of the AVC scheme and the SVC scheme according to the indication in the signal; and
    an interlayer predictor, which is configured to support encoding an upper layer with information about a lower layer, and which is turned off when the image encoding circuitry encodes the input image under the AVC scheme,
    wherein the image encoding circuitry comprises:
        a plurality of layer encoders each of which extracts motion information about a corresponding layer image of the input image through motion estimation and residual information about the corresponding layer image through in-picture prediction, and entropy-encodes the motion information and the residual information, selectively under at least one of the AVC scheme and the SVC scheme, to generate and output at least one of a corresponding AVC-encoded image and a corresponding SVC-encoded image;

the interlayer predictor which is disposed between each adjacent two of the plurality of layer encoders, and is configured to support encoding an upper layer image of the input image by an upper layer encoder among the plurality of layer encoders by providing the upper layer encoder with the motion information and the residual information about a lower layer image of the input image received from a lower layer encoder among the plurality of layer encoders;

a multiplexer which is configured to multiplex SVC-encoded images output from the plurality of layer encoders to output a multiplexed result to the network, according to a first selection signal; and the switch which is configured to select one of AVC-encoded images output from the plurality of layer encoders, and output the selected one of the AVC-encoded images to the storage medium, according to a second selection signal.

2. The encoding apparatus of claim 1, wherein the lower layer image is a layer image spatial-decimated from the upper layer image according to a condition of the lower layer encoder.

3. The encoding apparatus of claim 2, wherein, when encoding the input image into the AVC-encoded image, one of the plurality of layer encoders and the switch are turned on to operate.

4. The encoding apparatus of claim 2, wherein, when encoding the input image into the SVC-encoded image, at least one of the plurality of layer encoders, the interlayer predictor and the multiplexer are turned on to operate.

5. The encoding apparatus of claim 1, wherein a resolution of the lower layer image is lower than a resolution of the upper layer image.

6. The encoding apparatus of claim 1, wherein, according to the first selection signal:
the switch is turned off and the multiplexer is turned on;
the interlayer predictor is turned on so as to provide the motion information and the residual information about the lower layer image to the upper layer encoder;
each of the plurality of the layer encoders encodes the layer image based on the SVC scheme; and
the multiplexer outputs the multiplexed result to the network.

7. The encoding apparatus of claim 6, wherein, according to the second selection signal:
the multiplexer is turned off and the switch is turned on;
the interlayer predictor is turned off so as not to provide the motion information and the residual information about the lower layer image to the upper layer encoder;
each of the plurality of the layer encoders encodes the layer image based on the AVC scheme; and
the switch selects and outputs to the storage medium the selected one of the AVC-encoded images.

8. The encoding apparatus of claim 7, wherein, according to a third selection signal:
if an even-numbered internal clock signal is detected:
the switch is turned off and the multiplexer is turned on;
the interlayer predictor is turned on so as to provide the motion information and the residual information about the lower layer image to the upper layer encoder;
each of the plurality of the layer encoders encodes the layer image based on the SVC scheme; and
the multiplexer outputs the multiplexed result to the network, and
if an odd-numbered internal clock signal is detected:
the multiplexer is turned off and the switch is turned on;
the interlayer predictor is turned off so as not to provide the motion information and the residual information about the lower layer image to the upper layer encoder;
each of the plurality of the layer encoders encodes the layer image based on the AVC scheme; and
the switch selects and outputs to the storage medium the selected one of the AVC-encoded images.

9. The encoding apparatus of claim 8, wherein, according to the third selection signal, the upper layer encoder operates twice as faster as the lower layer encoder.

10. The encoding apparatus of claim 6, wherein, according to a condition of a receiving apparatus to receive the multiplexed result through the network, the multiplexer outputs selectively at least one of an SVC-encoded image output from the lower layer encoder and an SVC-encoded image output from the upper layer encoder.

11. The encoding apparatus of claim 1, wherein, according to the second selection signal:
the multiplexer is turned off and the switch is turned on;
the interlayer predictor is turned off so as not to provide the motion information and the residual information about the lower layer image to the upper layer encoder;
each of the plurality of the layer encoders encodes the layer image based on the AVC scheme; and
the switch selects and outputs to the storage medium the selected one of the AVC-encoded images.

12. The encoding apparatus of claim 1, wherein, according to a third selection signal:
if an even-numbered internal clock signal is detected:
the switch is turned off and the multiplexer is turned on;
the interlayer predictor is turned on so as to provide the motion information and the residual information about the lower layer image to the upper layer encoder;
each of the plurality of the layer encoders encodes the layer image based on the SVC scheme; and
the multiplexer outputs the multiplexed result to the network, and
if an odd-numbered internal clock signal is detected:
the multiplexer is turned off and the switch is turned on;
the interlayer predictor is turned off so as not to provide the motion information and the residual information about the lower layer image to the upper layer encoder;
each of the plurality of the layer encoders encodes the layer image based on the AVC scheme; and
the switch selects and outputs to the storage medium the selected one of the AVC-encoded images.

13. The encoding apparatus of claim 12, wherein, according to the third selection signal, the upper layer encoder operates twice as faster as the lower layer encoder.

* * * * *